(12) United States Patent
Currivan et al.

(10) Patent No.: US 7,728,866 B2
(45) Date of Patent: Jun. 1, 2010

(54) VIDEO TELEPHONY IMAGE PROCESSING

(75) Inventors: Bruce J. Currivan, Dove Canyon, CA (US); Xuemin Chen, San Diego, CA (US)

(73) Assignee: Broadcom Corp., Irvine, CA (US)

( * ) Notice: Subject to any disclaimer, the term of this patent is extended or adjusted under 35 U.S.C. 154(b) by 1063 days.

(21) Appl. No.: 11/266,448

(22) Filed: Nov. 3, 2005

(65) Prior Publication Data
US 2007/0115350 A1 May 24, 2007

(51) Int. Cl.
*H04N 7/14* (2006.01)
*G06K 9/00* (2006.01)

(52) U.S. Cl. .............. 348/14.01; 348/14.07; 348/14.08; 348/14.02

(58) Field of Classification Search ... 348/14.01–14.16; 382/118, 100, 254, 286, 276, 103
See application file for complete search history.

(56) References Cited

U.S. PATENT DOCUMENTS

| | | | | |
|---|---|---|---|---|
| 5,870,138 A | * | 2/1999 | Smith et al. ................. | 348/143 |
| 7,167,519 B2 | * | 1/2007 | Comaniciu et al. ..... | 375/240.08 |
| 2006/0050141 A1 | * | 3/2006 | Yoshimura ............... | 348/14.02 |

OTHER PUBLICATIONS

Myers; Videophone with enhanced user defined imaging system; Nov. 11, 1999; WO 99/57900.*

* cited by examiner

*Primary Examiner*—Melur Ramakrishnaiah
(74) *Attorney, Agent, or Firm*—McAndrews, Held & Malloy, Ltd.

(57) ABSTRACT

Herein described is a system and method for modifying facial video transmitted from a first videophone to a second videophone during a videophone conversation. A videophone comprises a videophone image processing system (VIPS) that stores one or more preferred images. The one or more preferred images may comprise an image of a person presented in an attractive appearance. The one or more preferred images may comprise one or more avatars. Additionally, the VIPS may be used to incorporate one or more facial features of the person into a preferred image or avatar. Furthermore, a replacement background may be incorporated into the preferred image or avatar. The VIPS transmits a preferred image of a first speaker of a first videophone to a second speaker of a second videophone by capturing an actual image of the first speaker and substituting at least a portion of said actual image with a stored image.

25 Claims, 6 Drawing Sheets

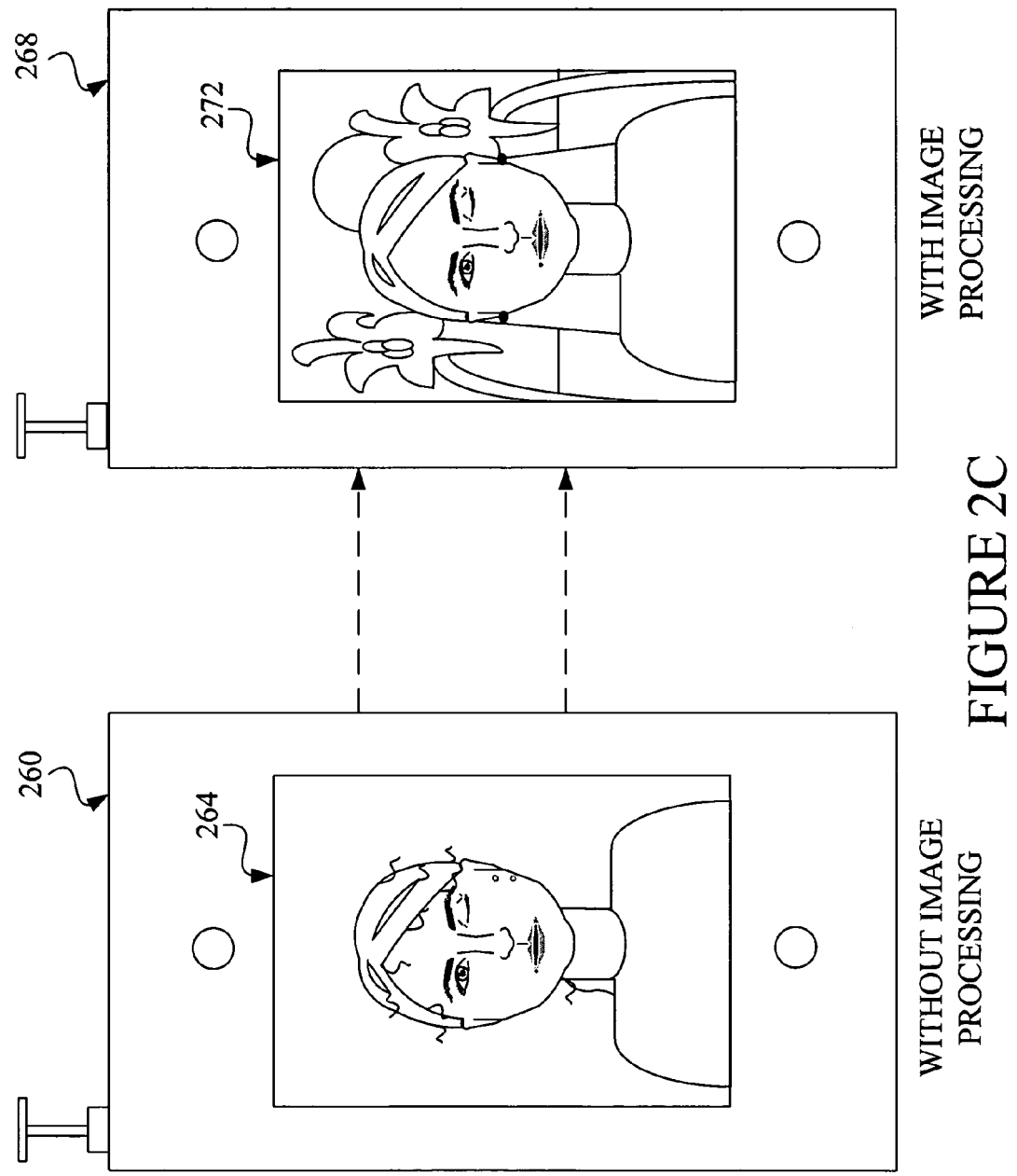

VIDEO TELEPHONY IMAGE PROCESSING

CROSS-REFERENCE TO RELATED APPLICATIONS/INCORPORATION BY REFERENCE

This application is related to and/or makes reference to U.S. application Ser. No. 11/266,442, filed on Nov. 3, 2005, which is hereby incorporated herein by reference in its entirety.

FEDERALLY SPONSORED RESEARCH OR DEVELOPMENT

Not Applicable

MICROFICHE/COPYRIGHT REFERENCE

Not Applicable

BACKGROUND OF THE INVENTION

As a result of advances in technology, cellular videophones may be used to enhance a phone conversation between two parties. During the conversation, the persons speaking may transmit headshots or facial images of each other, in the form of live streaming video, as a way to enhance and improve communication between the two parties. For example, facial expressions and lip movements may enhance communication between parties. On occasion, however, a party in a conversation may find that his appearance is less than desirable. As a consequence, he may be unwilling to transmit such live video of his facial image using his cellular videophone. Unfortunately, when this occurs, the benefit of transmitting such facial expressions and lip movements are eliminated during a conversation between the two parties.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide at least a system and a method that modifies facial video transmitted from a first videophone to a second videophone during a videophone conversation. The various aspects of the invention are substantially shown in and/or described in connection with at least one of the following figures, as set forth more completely in the claims.

These and other advantages, aspects, and novel features of the present invention, as well as details of illustrated embodiments, thereof, will be more fully understood from the following description and drawings.

BRIEF DESCRIPTION OF THE DRAWINGS

FIG. 2C is diagram that illustrates how image processing may be employed using the video image processing system (VIPS) to improve the appearance of a speaker, in accordance with an embodiment of the invention.

DETAILED DESCRIPTION OF THE INVENTION

Various aspects of the invention provide at least a system and a method for substituting and/or modifying an image provided by a speaker engaged in a video telephony conversation. In a preferred embodiment, a first speaker uses a wireless or cellular capable videophone to communicate with a second speaker using a compatible wireless or cellular capable videophone. Aspects of the invention provide for at least processing and transmitting an image of a speaker's head or face during a videophone conversation. The image may be generated by using a preferred image or avatar. One or more facial features of the speaker may be captured and edited into the preferred image or avatar. For example, when the lips of the speaker are incorporated into the preferred image or avatar, the image generated may comprise a lip-synched celebrity or politician. Else, the image may comprise a lip-synched speaker in a preferred facial appearance. For one or more reasons, an individual engaged in a video telephony conversation may wish to substitute his actual facial image with a preferred image or an avatar (i.e., an icon or any type of visual representation of the person speaking into the videophone). A speaker may utilize the system and method of the invention, for example, when he feels that his facial appearance is less than desirable. The speaker may select one of several preferred images or avatars that replaces or substitutes the actual facial image captured by the videophone. The preferred image (i.e., an image that provides an attractive appearance of the speaker) may be stored in a memory of the videophone. This stored image may be used to replace an undesirable image that is captured by the videophone. The avatar may comprise any type of image desired by a user of the videophone. For example, the avatar may comprise a facial image that resembles a celebrity or sports figure. Additionally, the various aspects of the invention allow one or more facial objects of a person's face to be edited (i.e., cropped and inserted) into the avatar or desired image. In a representative embodiment, the objects cropped and inserted may comprise the individual's lips, eyes, and/or nose, for example. As a result, the video presented to a receiving party of a videophone conversation may view the actual movements of the one or more facial objects selected, and a preferred image or avatar retains the actual lip movements present in the captured facial image. For example, an image of a famous celebrity may incorporate the expression provided by the speaker's lips, nose, and eyes. Furthermore, the various aspects of the invention may be adapted to incorporate one or more background images with the avatar. For example, a facial avatar may be presented pictured in a scenic environment. The scenic environment may be a country setting or a beach setting, for example.

Figure 1:
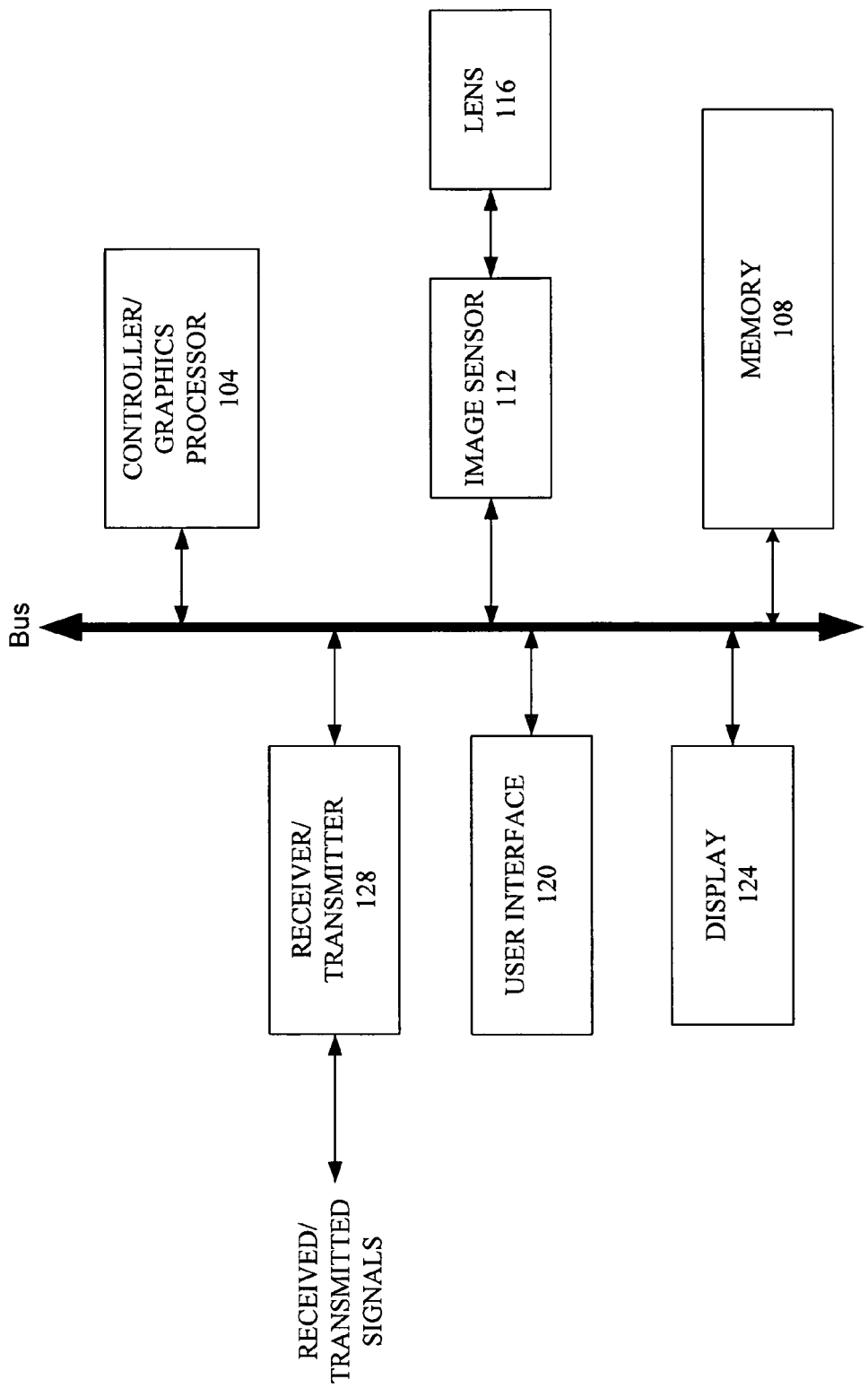
FIG. 1 is a block diagram illustrating a videophone image processing system (VIPS), as used in a videophone, which transmits video of a preferred image during a video telephony conversation, in accordance with an embodiment of the invention.

FIG. 1 is a block diagram illustrating a videophone image processing system (VIPS), as used in a videophone, which transmits video of a preferred image during a video telephony conversation, in accordance with an embodiment of the invention. The VIPS comprises a controller/graphics processor 104, a memory 108, an image sensor 112, a lens 116, a user interface 120, a display 124, and a receiver/transmitter 128. Also shown FIG. 1 is a bus used for providing a common electrical communication path between the components 104, 108, 112, 120, 124, 128 of the VIPS. The controller/graphics processor 104 is used to process captured facial images from a user (or speaker) speaking into a videophone. The lens 116 is used to focus and provide an image of the user's face onto the image sensor 112. Thereafter, the actual image is captured by the image sensor 112 and transmitted to the controller/graphics processor 104, where further processing may be performed. The controller/graphics processor 104 performs various processing that modifies the actual image captured by the videophone. The controller/graphics processor 104 may comprise circuitry that is used to control the memory 108, the image sensor 112, and the receiver/transmitter 128. The controller/graphics processor 100 also interfaces with the user interface 120, and the display 124. The user interface 120 may generate signals to the controller/graphics processor 104 based on one or more inputs provided by a user. The user interface 120 may be used to input one or more commands into the controller/graphics processor 104. For example, a user who wishes to engage in a videophone conversation with another party may use the user interface 120 to specify what preferred image or avatar he wishes to use. In another instance, a user of the videophone may use the user interface 120 to specify one or more background images to be used with the preferred image or avatar chosen. In a representative embodiment, the invention may be adapted to incorporate a person's actual facial image into the one or more selected backgrounds. A background image excludes the preferred image (facial image) or avatar. The selected background image may be used to replace the existing background. The avatar or preferred image may be incorporated into the selected background. The background may comprise an image of a fantasy location, such as a palace or tropical island, for example. The controller/graphics processor 104 may execute software and/or firmware that implements one or more video segmentation techniques. The one or more video segmentation techniques may employ object based video segmentation wherein each of the one or more facial features of the actual facial image is captured, isolated, and individually stored as objects into the memory 108. These facial features or facial objects may be inserted into an avatar or a preferred image. The controller/graphics processor 104 may crop a facial feature of a selected avatar and subsequently insert a corresponding facial feature from the actual facial image. For example, a person's lips may be substituted or replaced using the object based video segmentation discussed. As a result, a user's lips, and associated lip movements are captured, and incorporated into the avatar or preferred facial image, for transmission to the other party, during a videophone conversation. Similarly, the user's eyes may be cropped and inserted into the selected avatar, for example, using the object-based video segmentation. The software and/or firmware may be stored in the memory 108 of the videophone. The memory 108 may comprise a non-volatile memory, such as a flash memory, for example. After the desired actual facial features are incorporated into the selected avatar or preferred image, a preferred background may be selected to replace the actual background image, in accordance with the various aspects of the invention. Thereafter, the desired image is transmitted to the party that is speaking to the user. Thus, in a preferred embodiment, a modified image or preferred display image may incorporate one or more actual facial features and a substituted background. This modified or preferred display image is transmitted to the other party's videophone. In accordance with the various aspects of the invention, the controller/graphics processor 104 may process one or more facial movements and/or facial expressions of the user, such that the avatar simulates those movements using the avatar's facial features. For example, the avatar's lips may lip-synch with the user's lip movements. Other facial features of the avatar may imitate or mimic the actual face of the user. Various aspects of the invention allow the videophone image processing system (VIPS) to provide various image processing functions. The software may implement an algorithm that merges the actual captured facial image of the user's head with information from an object database, such that the hidden side of the head may be rotated back, resulting in a frontal view. Furthermore, the software may implement an algorithm that combines the data obtained from the captured facial video with the object database to render an optimized facial image. The VIPS may comprise system with sufficient processing resources capable of developing a profile or model image of the user without using a stored image in memory as a reference.

Figure 2A:
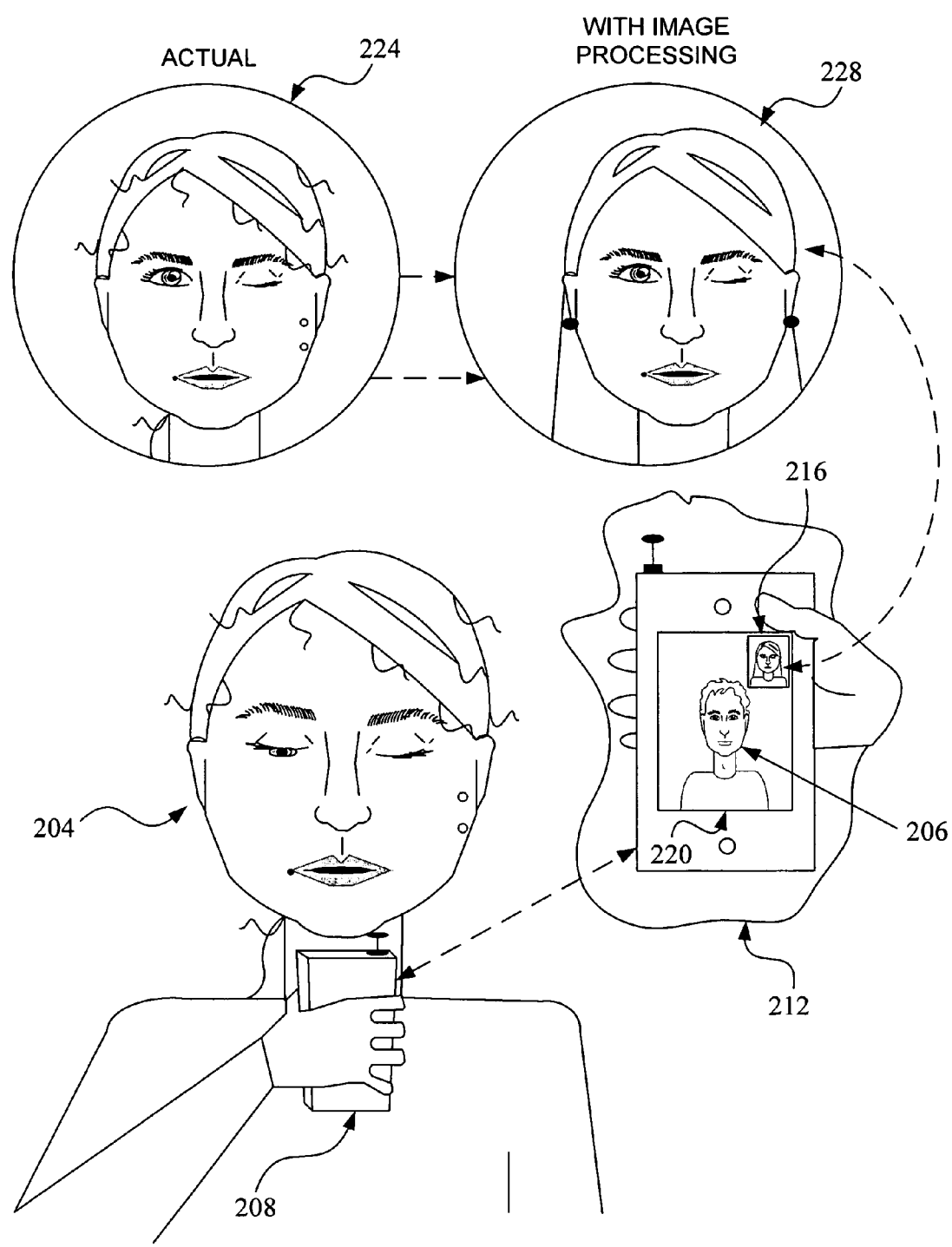
FIG. 2A is relational diagram illustrating a user using a videophone in accordance with an embodiment of the invention.

FIG. 2A is relational diagram illustrating a user using a videophone 208 in accordance with an embodiment of the invention. The diagram of FIG. 2A shows a user 204 speaking into the videophone 208 during a conversation with another party. In this representative embodiment, a female user (or local user) 204 is shown speaking to a male user (or remote user) 206. The frontal aspect 212 of the videophone 208 provides an illustration of the display of the videophone 208 while the female user 204 is talking to the male user 206. In this representative embodiment, the videophone 208 is capable of providing a picture-in-picture (PIP) display 216, such that the female user 204 may monitor the image being transmitted to the videophone of the male user 206. As illustrated in FIG. 2A, the PIP displays a modified image of the female user 204. The PIP is provided within the display 220 of the videophone 208. The female user 204 instructs the videophone 208 to incorporate one or more of her facial features into a stored image. In this representative embodiment, the stored image comprises a preferred image of her. For example, the stored facial image may comprise a picture of the female user 204 in a more attractive appearance. In this representative embodiment, the female user 204 has not combed her hair, and as such, presents an untidy appearance. Further, the face of the female user 204 contains a number of unsightly blemishes that are undesirable. As a consequence, the female user 204 utilizes the videophone 208 to substitute the actual facial image with a preferred stored facial image. Further, in this representative embodiment, the videophone 208 crops the eyes and lips from the actual facial image and incorporates them into the stored facial image. As shown by way of the "actual" insert 224 and the "with image processing" insert 228 illustrated in FIG. 2A, the female user's lips and eyes from the actual facial image are incorporated into the stored facial image. As illustrated in FIG. 2A, the local user 204 was winking when the actual facial image was captured. Because the eyes and lips are incorporated into the stored facial image, the wink is retained when the preferred facial image is transmitted to the male user 206. The disheveled hair and unsightly blemishes are eliminated by way of using the stored facial image.

Figure 2B:
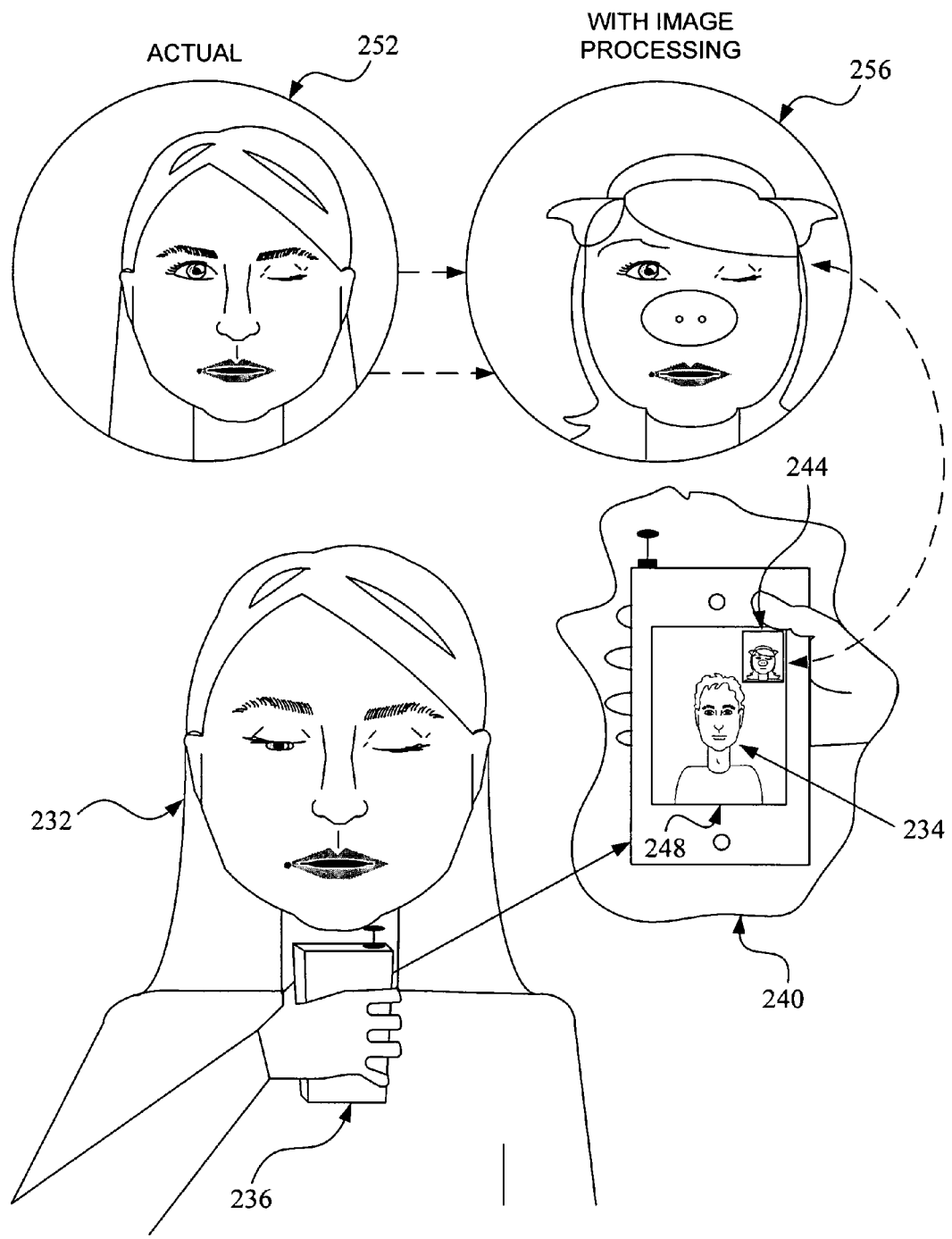
FIG. 2B is a relational diagram illustrating a user using a videophone in accordance with an embodiment of the invention.

FIG. 2B is a relational diagram illustrating a user using a videophone 236 in accordance with an embodiment of the invention. The diagram of FIG. 2B shows a user 232 speaking into the videophone 236 during a conversation with another party. In this representative embodiment, a female user 232 is shown speaking to a male user 234. The frontal aspect 240 of the videophone 236 provides an illustration of the display of the videophone 236 while the female user 232 is speaking to the male user 234. In this representative embodiment, the videophone 236 is capable of providing a PIP display 244, such that the female user 232 may monitor the image being transmitted to the videophone used by the male user 234. As illustrated in FIG. 2B, the PIP displays a modified image of the female user 232. The PIP is provided within the display 248 of the videophone 236. The female user 232 instructs the videophone 236 to incorporate one or more of her facial features into a stored image. In this representative embodiment, the female user 232 prefers being visualized by way of using an avatar with pig-like facial features. The avatar is stored in the memory of the videophone 236. It is contemplated that the female user 232 may have any number of reasons to use such an avatar when transmitting a live video of her when speaking to the male user 234. As a consequence, the female user 232 utilizes the videophone 236 to substitute the actual facial image with the preferred facial image (the pig avatar). Further, in this representative embodiment, the videophone 236 crops the eyes and lips from the actual facial image and incorporates them into the avatar. As shown by way of the "actual" insert 252 and the "with image processing" insert 256 illustrated in FIG. 2B, the female user's lips and eyes from the actual facial image are incorporated into the avatar. As shown, the local user 232 was winking when the actual facial image was captured. Because one or more user selectable facial objects or facial features (e.g., eyes and lips) are incorporated into the avatar, the wink exhibited by the female user 232 is retained when the avatar is transmitted to the male user 234.

FIG. 2C is diagram that illustrates how image processing may be employed using the video image processing system (VIPS) to improve the appearance of a speaker, in accordance with an embodiment of the invention. In relation to the embodiment of FIG. 2A, FIG. 2C portrays two scenarios: a) a videophone 260 and its corresponding display 264 when no image processing is applied to facial video captured from a female speaker, and b) a videophone 268 and its corresponding display 272 when image processing is applied to facial video captured from a female speaker. For the case where no image processing is applied, the display 264 of this videophone 260 illustrates an actual facial image in which the female speaker's appearance is undesirable. On the other hand, in the case when image processing is applied, the display 272 of the videophone 268 illustrates a preferred image, in which a stored facial image of the female speaker is used. Furthermore, the movements of the female's eyes and lips are incorporated into the stored facial image. In addition, the embodiment of FIG. 2C, which incorporates image processing in accordance with the various aspects of the invention, also illustrates the incorporation of a preferred background—a tropical island setting.

Figure 3A:
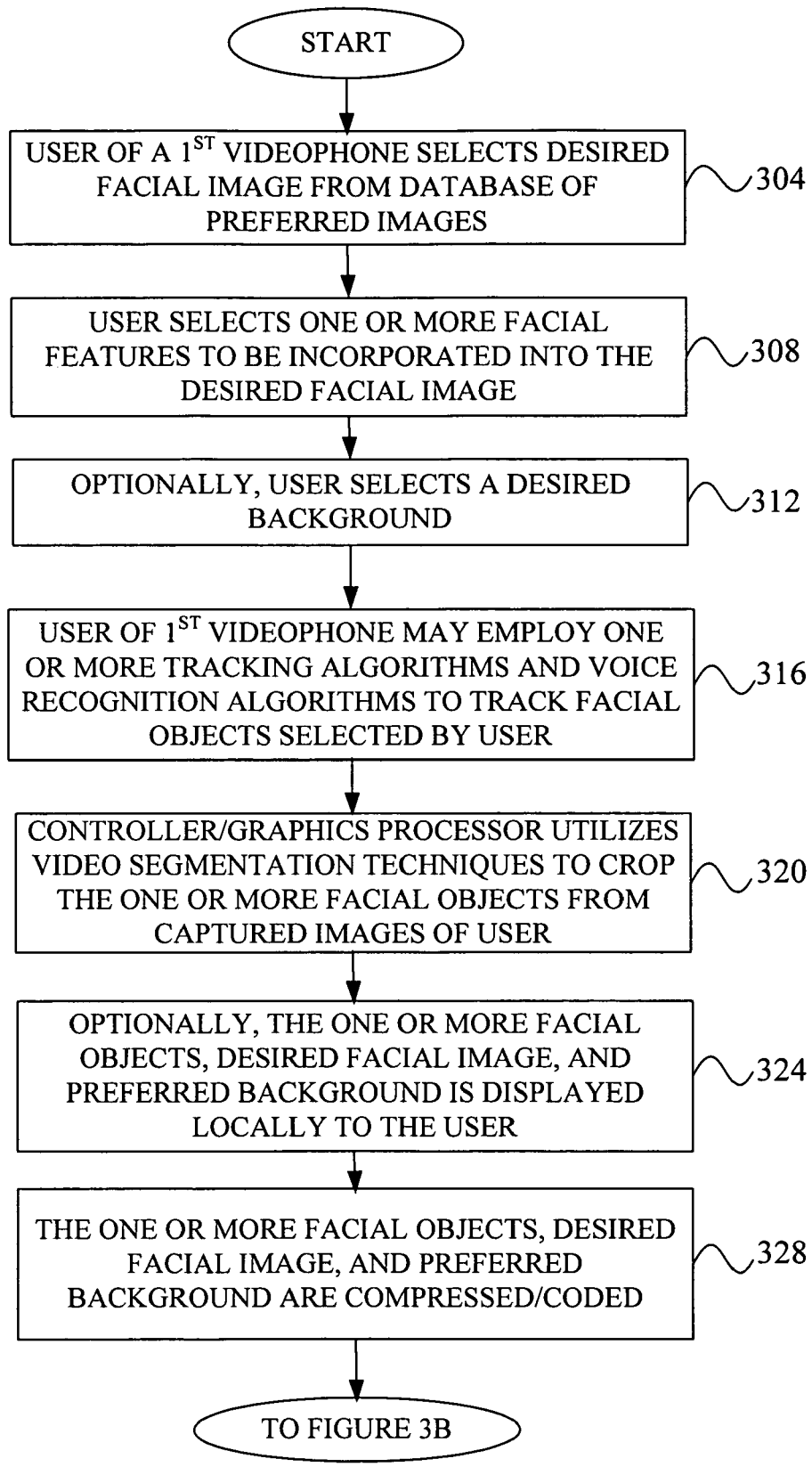
FIGS. 3A and 3B are operational flow diagrams that describe the use of the videophone image processing system (VIPS) during a videophone conversation, in accordance with an embodiment of the invention.
Figure 3B:
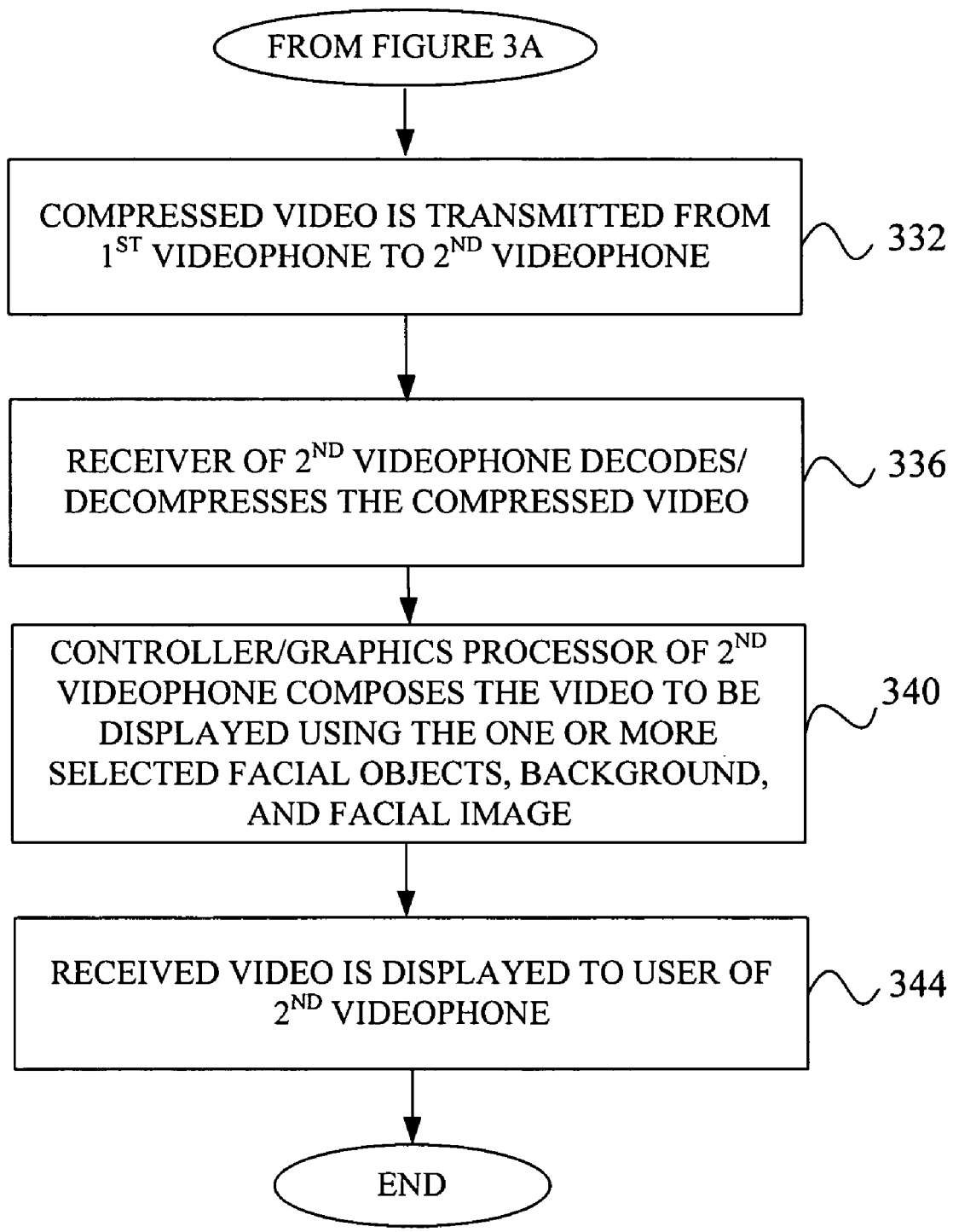

FIGS. 3A and 3B are operational flow diagrams that describe the use of the videophone image processing system (VIPS) during a videophone conversation, in accordance with an embodiment of the invention. At step 304, a user or speaker of a first videophone selects a stored image (i.e., a desired facial image) from a database of preferred images. The database may be established in a memory of the VIPS, as an initialization procedure, prior to engaging in one or more videophone conversations. The stored image may comprise an image that provides an attractive appearance of the user, for example. The desired facial image may comprise an avatar that is used to represent the user. The avatar may comprise, for example, a computer generated character, a cartoon character, a historically significant public figure, a character from a video game, a literary character, a movie character, or an animal. At step 308, the user may select one or more of his facial features that will be incorporated into the selected facial image. The facial features he uses may comprise his eyes, lips, and nose, for example. The user may select any number of facial features or facial objects from his face that are incorporated into the selected facial image. Next, at step 312, the user may optionally, select a desired background. One or more backgrounds may be stored in a memory of the VIPS. The background may comprise a tropical island setting or beach setting, for example. Next, at step 316, the user of the first videophone may subsequently employ one or more tracking algorithms and voice recognition algorithms for tracking the facial features that were previously selected by the user. The one or more tracking algorithms and voice recognition algorithms may be used for cropping the desired facial objects and subsequently inserting the facial objects into the selected facial image. Details of the tracking and voice algorithms may be found in U.S. application Ser. No. 11/266,442, filed on Nov. 3, 2005, which is hereby incorporated herein by reference in its entirety. At step 320, a controller/graphics processor located in the VIPS, may utilize video object segmentation techniques to crop one or more facial objects and incorporate the one or more facial objects into the desired facial image. Further, the desired facial image may be incorporated into a preferred background. Optionally, at step 324, by way of control from the user, the modified image may be displayed locally to the user. Next, at step 328, the one or more facial objects, the desired facial image, and the preferred background are compressed/coded for transmission to a user or speaker of a second videophone. Thereafter, at step 332, the compressed/coded video is transmitted from the first videophone to the second videophone. At step 336, the receiver of the second videophone decodes/decompresses the compressed/coded video. Next, at step 340, the controller/graphics processor of the second videophone appropriately renders the video to be displayed after receiving the one or more selected facial objects, the preferred background, and the selected facial image. Finally, at step 344, the received video is displayed to the user of the second videophone.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A video image processing system comprising:
a first videophone for performing video object segmentation of one or more facial objects of a facial portion of an actual image captured by said first videophone; said first videophone comprising a graphics processor capable of cropping said one or more facial objects from said actual image and inserting said one or more facial objects into a stored facial image to generate a preferred image, said preferred image transmitted from said first videophone; and
a second videophone for receiving said preferred image from said first videophone, said second videophone for displaying said preferred image.

2. The video image processing system of claim 1 wherein said one or more facial objects comprise a person's lips.

3. The video image processing system of claim 1 wherein said one or more facial objects comprise a person's eyes.

4. The video image processing system of claim 1 wherein said preferred image is displayed and monitored by a user of said first videophone.

5. The video image processing system of claim 1 wherein said preferred image is generated by substituting the background of said actual image with a background stored within said first videophone.

6. The video image processing system of claim 1 wherein said first videophone provides a picture-in-picture (PIP) display of said preferred image.

7. A method for transmitting enhanced video during a videophone conversation between a first videophone and a second videophone, said method comprising:
storing one or more preferred facial images into said first videophone prior to said videophone conversation;
using a preferred facial image of said one or more preferred facial images to replace a portion of an actual facial image of an actual image, said actual image captured by said first videophone during said videophone conversation, thereby generating said enhanced video; and
transmitting said enhanced video to said second videophone.

8. The method of claim 7 wherein said replacing said portion comprises:
selecting one or more facial features of said actual facial image;
performing video segmentation of said actual facial image to isolate said one or more facial features;
storing said one or more facial features into a memory of said first videophone; and
incorporating said one or more facial features into said preferred facial image of said one or more preferred facial images, such that actual facial movements and/or expressions are retained and transmitted during said videophone conversation.

9. The method of claim 7 further comprising replacing an existing background of said actual image with a selected background, said selected background stored in a memory of said first videophone.

10. The method of claim 7 wherein said first videophone is capable of displaying said enhanced video during said videophone conversation.

11. The method of claim 7 wherein said preferred facial image comprises an image of a user of said first videophone.

12. The method of claim 7 wherein said one or more preferred facial images comprises an avatar.

13. The method of claim 12 wherein said avatar comprises one of: a computer generated character, a cartoon character, a historically significant public figure, a character from a video game, a literary character, a movie character, and an animal.

14. A method of transmitting a preferred image of a first user of a first videophone to a second user of a second videophone, said method comprising:
capturing an actual image comprising a facial image of said first videophone using said first videophone; and
substituting a portion of said facial image of said actual image with a corresponding stored facial image to generate said preferred image, said corresponding stored facial image selected by said first videophone user.

15. The method of claim 14 wherein said substituting comprises:
extracting one or more facial features from said actual image; and
incorporating said one or facial features of said actual image into said corresponding stored facial image.

16. The method of claim 14 further comprising replacing an existing background of said actual image with a stored background image.

17. The method of claim 14 wherein said corresponding stored facial image comprises a facial image of said first user of said first videophone.

18. The method of claim 14 wherein said corresponding stored facial image comprises an avatar.

19. The method of claim 18 wherein said avatar comprises one of: a computer generated character, a cartoon character, a historically significant public figure, a character from a video game, a literary character, a movie character, and an animal.

20. The method of claim 14 wherein said first videophone transmits said preferred image to said second videophone by way of wireless or cellular transmission.

21. A videophone comprising:
a graphics processor used for performing video object segmentation of an image captured by said videophone; said graphics processor capable of cropping one or more facial objects from said actual image and inserting said facial objects into a stored facial image to generate a preferred image, said preferred image transmitted from said videophone to a receiving videophone for display on said receiving videophone.

22. The videophone of claim 21 wherein said one or more facial objects comprise a person's lips.

23. The videophone of claim 21 wherein said one or more facial objects comprise a person's eyes.

24. The videophone of claim 21 wherein said preferred image is generated by substituting a background of said actual image with a background stored within said videophone.

25. The videophone of claim 21 wherein said videophone provides a picture-in-picture (PIP) display of said preferred image.

* * * * *